A. A. FRIZ.
COMBINED NUT AND WRENCH.
APPLICATION FILED JULY 26, 1909.
940,000.
Patented Nov. 16, 1909.
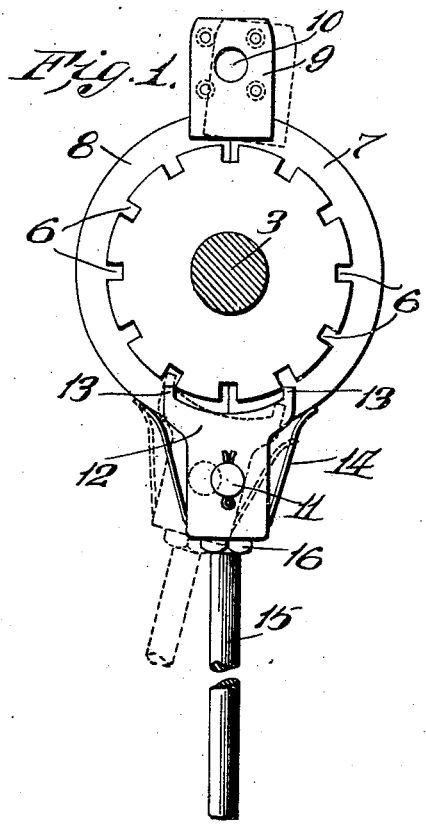
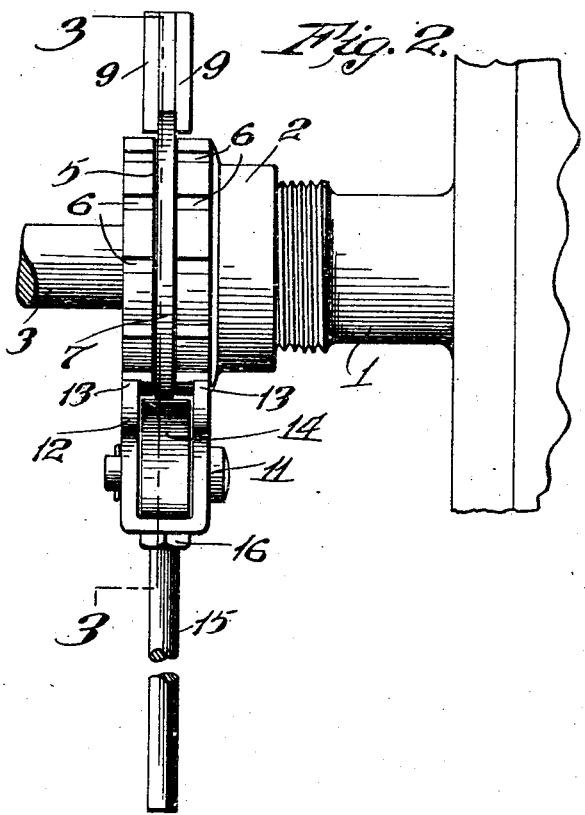
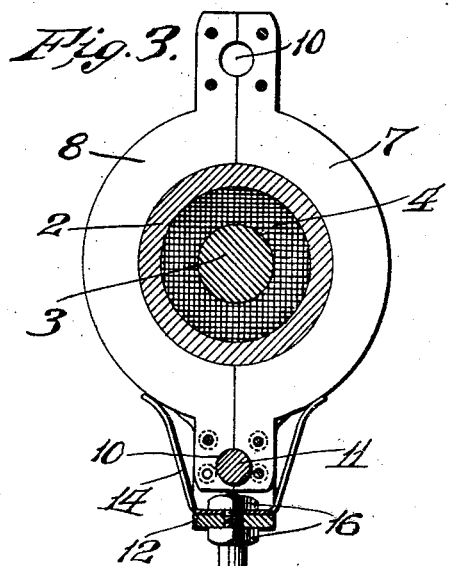
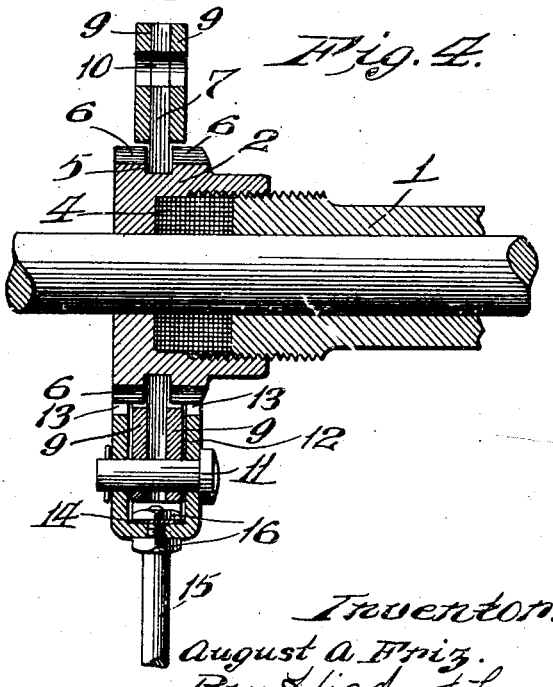
Attest:
H. G. Fletcher
E. L. Wallace
Inventor:
August A. Friz.
By Higdon & Longan
Attys.

UNITED STATES PATENT OFFICE.

AUGUST A. FRIZ, OF ST. LOUIS, MISSOURI.

COMBINED NUT AND WRENCH.

940,000.

Specification of Letters Patent.  Patented Nov. 16, 1909.

Application filed July 26, 1909. Serial No. 509,672.

*To all whom it may concern:*

Be it known that I, AUGUST A. FRIZ, a citizen of the United States, and resident of St. Louis, Missouri, have invented certain new and useful Improvements in a Combined Nut and Wrench, of which the following is a specification containing a full, clear, and exact description, reference being had to the accompanying drawings, forming a part hereof.

This invention relates to improvements in a combined nut and wrench, the object of the invention being to construct a combined wrench and packing nut for stuffing boxes or the like.

For the above purposes this invention consists in certain novel features of construction and arrangement of parts as will be hereinafter more fully set forth, pointed out in my claims and illustrated in the accompanying drawings: in which—

Figure 1 is an end elevation of the nut and wrench showing the wrench in an operative position in dotted lines; Fig. 2 is an elevation of the wrench and nut as applied to a stuffing box; Fig. 3 is a vertical sectional elevation taken on the line 3—3 of Fig. 2; and Fig. 4 is a longitudinal sectional elevation through the stuffing box and packing nut showing the wrench in section and carried by said nut.

Referring by numerals to the accompanying drawings: 1 designates the stuffing box, 2 the packing nut and 3 the piston rod, the stuffing box and piston rod being of ordinary construction.

In the construction shown the packing nut is formed hollow to provide a chamber for the stuffing 4 and instead of being formed angular the nut is cylindrical and provided with an annular depression 5. The faces on each side of the depression 5 are provided with slots 6.

A ring comprising, mating members 7 and 8, embraces the nut 2 and the annular groove 5 and are clamped together by the plates 9, the ends of said ring members and plates being provided with apertures 10, through one of which openings a pin 11 is inserted to pivotally carry the bifurcated wrench head 12.

Teeth 13 are formed integral with the head 12 and are arranged in such relation to the slots 6 so as to normally permit movement of the nut relative to the wrench.

A substantially U-shaped spring 14 is carried by the head 12 and its free ends arranged to slide upon the periphery of the ring members 7 and 8.

A lever 15 is secured to the head 12 by the nuts 16 on the inner end of said lever and one of said nuts being arranged to secure the spring 14 to the head.

In the construction shown the packing nut is formed hollow and the stuffing box arranged to act as a gland for compressing the stuffing, but it is obvious that the stuffing box may be formed hollow and the gland carried by the nut, which is a common construction.

This wrench is especially designed for use in connection with a packing nut through which a machine element either rotates or is moved longitudinally through the nut.

I have especially designed my improved packing nut and wrench for employment on the stuffing box of a steam engine, hydraulic motor or in connection with refrigerating systems, wherein fluids under pressure may escape through the stuffing box when the stuffing therein becomes worn and loose.

It would be obvious that by the employment of a combined wrench and packing nut employed upon a steam engine or the like, that when the stuffing in the box becomes worn or loosened steam will escape therefrom, and by the employment of my wrench and nut the engineer or operator may, by simply grasping the lever of my wrench and causing the teeth to engage the packing nut, easily and quickly adjust the nut and stop the leakage of steam.

By the employment of my improved nut and wrench in connection with the stuffing box of a refrigerating system, the leakage of the chemicals through a defective stuffing box will in no wise affect the easy and quick adjusting of the nut to stop such leakage.

By the employment of the ordinary nut in connection with refrigerating systems the leakage of chemicals through a defective stuffing box causes ice or frost to collect on and cover the nut making it an operation consuming no little time and trouble to remove such ice or frost before a wrench may be properly seated on the nut.

I claim:

1. The combination with a nut having an annular groove formed in its body portion, of a ring embracing said groove, a head pivoted to said ring teeth formed integral with said head arranged to engage the nut and a lever secured to said head.

2. In combination with a nut having an annular groove formed in its body portion, there being slots formed in the periphery of said nut, a ring carried by said nut, a head pivoted to said ring, teeth on said head, a spring carried by said head adapted to engage said ring and normally hold the teeth out of engagement with said slots, and a lever carried by said head.

3. In combination with a nut having an annular groove formed in its body portion, there being slots formed in the periphery of said nut, a separable ring in said groove, extensions formed on said ring, a head pivoted to said extensions, a spring carried by said head adapted to engage said ring to normally hold the teeth out of engagement with the slots and a lever carried by said head.

4. In combination with a cylindrical nut having an annular groove formed in its periphery, there being slots formed in the periphery of said nut, a ring consisting of two mating halves fitted in said annular groove, extensions formed on said ring, plates connecting said extensions, a bifurcated head pivoted to one of said extensions, a spring carried by said head for engagement with said ring, teeth formed integral with the head for engagement with said slots and a lever carried by said head.

In testimony whereof, I have signed my name to this specification, in presence of two subscribing witnesses.

AUGUST A. FRIZ.

Witnesses:
   E. E. LONGAN,
   E. L. WALLACE.